(12) United States Patent
Morito et al.

(10) Patent No.: US 6,830,195 B2
(45) Date of Patent: Dec. 14, 2004

(54) MERCHANDISE TAG

(75) Inventors: Hiroshi Morito, Tokyo (JP); Shunji Masuda, Tokyo (JP)

(73) Assignee: Leading Information Technology Institute, Inc.

(*) Notice: Subject to any disclaimer, the term of this patent is extended or adjusted under 35 U.S.C. 154(b) by 0 days.

(21) Appl. No.: 10/395,804

(22) Filed: Mar. 24, 2003

(65) Prior Publication Data
US 2003/0178496 A1 Sep. 25, 2003

(30) Foreign Application Priority Data
Mar. 25, 2002 (JP) .................................... 2002-082914

(51) Int. Cl.⁷ .............................................. G06K 19/06
(52) U.S. Cl. ...................................... 235/492; 235/383
(58) Field of Search ........................... 235/492, 383, 235/375, 380, 382.5, 454, 455, 487, 462.01, 381; 40/404, 665, 663, 405; 283/904

(56) References Cited

U.S. PATENT DOCUMENTS

| | | | | |
|---|---|---|---|---|
| 4,300,297 A | * | 11/1981 | Betterley | 40/662 |
| 4,399,599 A | * | 8/1983 | Howe | 29/241 |
| 4,570,368 A | * | 2/1986 | Stover | 40/645 |
| 5,225,162 A | * | 7/1993 | Scoville | 422/56 |
| 5,538,291 A | * | 7/1996 | Gustafson | 235/487 |
| 5,697,177 A | * | 12/1997 | Ludlow et al. | 40/665 |
| 6,401,372 B1 | * | 6/2002 | Kovner | 40/404 |

FOREIGN PATENT DOCUMENTS

| | | | |
|---|---|---|---|
| JP | 402102099 A | * | 4/1990 |
| JP | 9-61521 | | 3/1997 |

OTHER PUBLICATIONS

Japanese Patent Abstract in English—JP 9–61521.

* cited by examiner

*Primary Examiner*—Thien M. Le
(74) *Attorney, Agent, or Firm*—Fulbright & Jaworski

(57) ABSTRACT

The disclosed merchandise tag is a non-contact wireless tag, has a color change layer on its surface, and the price data stored therein can be read out and rewritten. It can be easily attached and removed, reduces the amount of attachment implements used, and allows the display thereon to be easily changed by means of a heat treatment, magnetic treatment, or the like. The merchandise tag has an attachment hole 2 and a slit 3 that is formed to extend from the attachment hole up to the circumference of the merchandise tag, and contains a semiconductor integrated circuit, and one or more price data entries can be stored in the semiconductor integrated circuit. It preferably includes a rounded portion 4 at the intersection between the slit 3 and the circumference such that the angle formed between the slit 3 and the circumference is between 20 and 70 degrees.

6 Claims, 2 Drawing Sheets

MERCHANDISE TAG

TECHNICAL FIELD

The present invention relates to a non-contact wireless tag that can easily be attached and removed, and that preferably can be used with apparel, shoes, handbags, wallets, and other merchandise to display a price stored in the tag.

BACKGROUND ART

Non-contact wireless tags are beginning to be used for collecting merchandise management information when distributing and selling apparel, shoes, handbags, wallets, and other merchandise. However, because non-contact wireless tags have a semiconductor chip, an antenna layer, and the like, they are more expensive than conventional merchandise tags that simply display a price printed on the surface thereof. Thus, the use of non-contact wireless tags is often limited to merchandise in which merchandise management information is particularly important.

For example, when merchandise is shipped to one's store, distribution information is necessary for merchandise management even after the shipment. However, with merchandise that is sold wholesale to franchise stores, merchandise management after shipment is the responsibility of the receiver and thus merchandise management is normally provided by the shipper. Thus, attaching non-contact wireless tags only to merchandise that is shipped to one's own store is preferable from the point of view of cost effectiveness. In addition, sales information is important for gaining an understanding of sales at a large main store. However, with respect to small stores, there are times when sales information is not necessary, and thus from the point of view of cost effectiveness, it is preferable to attach non-contact wireless tags only to merchandise for a relatively large main store.

Thus, it has been the conventional practice for normal merchandise tags to be attached to all merchandise, and merchandise tags that employ a non-contact wireless tag are only attached to specially classified merchandise after all of the merchandise have been classified.

In addition, with non-contact wireless tags, it is possible to rewrite the data stored in the semiconductor memory. Thus, from the point of view of cost and protection of the natural environment, it is preferable that they be removed when the merchandise is sold, and then collected and reused.

Moreover, the price of the merchandise is generally displayed on the merchandise tag. However, with merchandise such as apparel, gold jewelry, shoes, handbags, wallets, and other items in which the sales thereof fluctuate according to the preferences of the customer, the price of the merchandise is changed as needed, and the displayed price is changed frequently. For changing the displayed price, a printed label having the new price is normally prepared, which is then attached to the merchandise tag. However, the attached label must be removed when the tag is to be reused, and this is an impediment to the reuse of the merchandise tag.

On the other hand, technology has been proposed in which a layer that changes color by means of heating is formed on the surface of the tag, and the display thereon is changed by means of heat processing. Technology has also been proposed in which a magnetic layer and a powdery magnetic substance are provided on the surface of a tag, and by magnetizing the magnetic layer, the magnetic substance is adsorbed and the color changes. However, the heat treatment or magnetic treatment for this type of display change is difficult to conduct while the tag is attached to the merchandise. The tag must be removed from the merchandise when changing the display, and then reattached thereto. A merchandise tag that employs this type of non-contact wireless tag is attached to a conventional merchandise tag, taken off in order to be collected, and taken off in order for the display to be changed, and after heat treatment/magnetic treatment, is reattached. Thus, attachment and reattachment frequently occur.

As shown in FIG. 4, a conventional non-contact wireless tag has an attachment hole 2 formed in the approximate periphery of the non-contact wireless tag 1. Thus, just like with a normal merchandise tag, it is attached by means of an attachment implement such as a cord, a plastic ring, and the like. However, when the non-contact wireless tag 1 is used in addition to a normal merchandise tag, two attachment implements are used, and this is not preferable from the cost and aesthetic points of view. In addition, when removing the tag for the purpose of recycling it or changing the display, the attachment implement must be cut by means of a pair of scissors or the like, requiring time and effort, and when reattaching it, an attachment implement must again be consumed. Moreover, if a label or the like is pasted onto the merchandise tag in order to change the display, it is difficult to reuse the tag, which is particularly advantageous for a non-contact wireless tag.

SUMMARY OF THE INVENTION

A primary objective of the present invention is to provide a reusable non-contact wireless tag that can be easily attached and removed, which reduces the amount of attachment implements used, and which allows the tag to be recycled and/or a price display thereon to be easily changed by means of an external heat treatment, magnetic treatment, or the like.

The merchandise tag according to the present invention has an attachment hole and a slit that is formed to extend from the attachment hole up to the circumference of the merchandise tag, and contains a semiconductor integrated circuit by means of which one or more pieces of price data can be stored and read out.

Preferably, a rounded mouth portion is formed at the intersection between the slit and the circumference, and the angle formed between the slit and the circumference is between 20 and 70 degrees.

In one embodiment, the non-contact wireless tag has a color change layer on its surface, which is used to display different price data stored in the tag.

BRIEF DESCRIPTION OF THE DRAWINGS

An exemplary embodiment of the invention will now be described in detail with reference to the appended Drawings, in which.

DETAILED DESCRIPTION OF EMBODIMENTS OF THE INVENTION

First Embodiment

Figure 1:
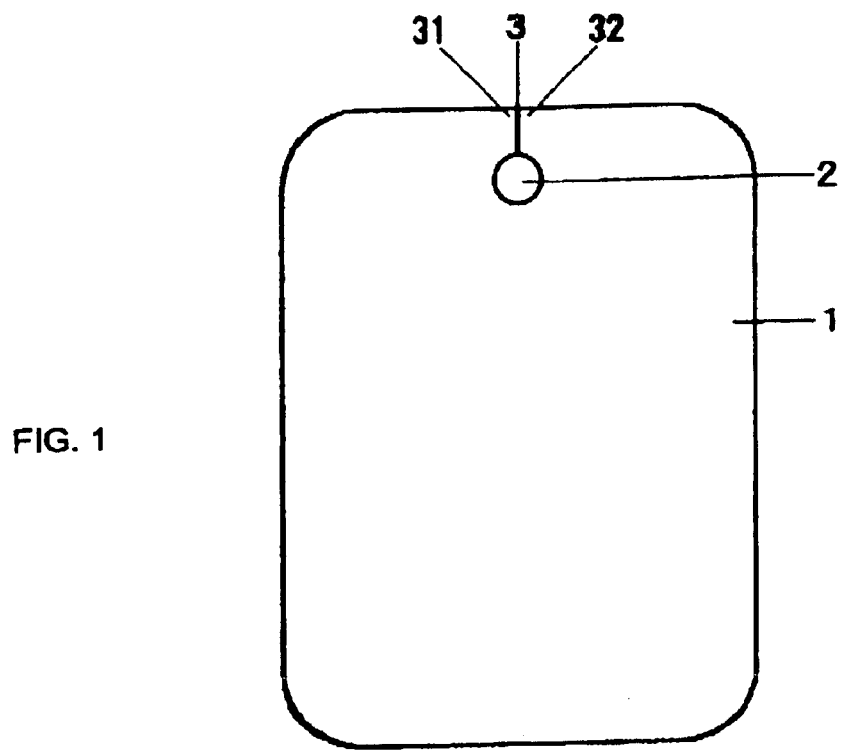
FIG. 1 is a plan view of a merchandise tag according to a first embodiment of the present invention.

As shown in FIG. 1, a non-contact wireless merchandise tag according to a first embodiment of the present invention has an attachment hole 2 formed in the approximate periphery of a non-contact wireless tag 1, and a slit 3 is formed therein that runs from the periphery to the attachment hole 2.

Suitable materials for this non-contact wireless tag 1 are plastics such as PET and the like that are not easily deformed and are flexible. The non-contact wireless tag 1 has a layer on its surface that changes color by means of a heat treatment or magnetic treatment. In addition, multiple pieces of price data are stored in the internal semiconductor memory of the non-contact wireless tag 1, such as the normal sales price, the store sale price, the preferred customer sales price, the outlet sale price, and the like.

When a merchandise tag constructed as shown in the first embodiment is to be attached to the merchandise, etc. by passing a cord or a ring-shaped attachment implement through the attachment hole 2, the slit 3 formed in the attachment hole 2 can be opened by twisting the area around it, i.e., by bending flaps 31 and 32 on both sides of the slit 3 in opposite directions (front and back), and the attachment implement can be attached through the gap opened therein.

Advantageously, if a conventional merchandise tag is already attached to the merchandise by means of a conventional cord or ring-shaped attachment implement, the same implement can be used to attach non-contact wireless tag and a second attachment implement is not employed, thus making a cost effective and aesthetic attachment of the non-contact wireless tag possible.

After attachment, if the twisting of the flaps 31 and 32 on both sides of the slit 3 is stopped, the tag will revert to its original form, and the tag will not fall off because the slit 3 will be closed. When the tag is to be removed, if the flaps 31 and 32 on both sides of the slit 3 are again twisted, the slit 3 opens, and the tag can be easily removed.

In this way, because attachment and removal are quite easy, it will be easy to change the display by means of a heat treatment, magnetic treatment, or the like.

An example of how to change the displayed price will now be described. First, the flaps 31 and 32 on both sides of the slit 3 on the tag are twisted and the tag is removed from the attachment implement. The internal data in the tag is read out, and a new price is set. A heat treatment, magnetic treatment, or the like is applied based upon the new price that was set, the layer on the surface of the tag changes color, and the new price is displayed. Then, the flaps 31 and 32 on both sides of the slit 3 of the tag are again twisted, and the tag is attached to the previous attachment implement.

In this way, because the display can be changed with the merchandise tag removed, the work of changing the display is made simple. In addition, damage to the merchandise to which the tag is attached can be avoided.

In addition, by connecting a heat/magnetic treatment device to an internal data-reading device, the internal data on the merchandise tag can be read out and the price can be automatically set. Thus, it is possible to freely change the display on tags for multiple types of merchandise in any order. In particular, with merchandise to be sold at an outlet that is collected as unsold merchandise from other stores, it is difficult to sort and process the merchandise by type. However, by storing in advance the outlet price as part of the data in the tag attached to each merchandise item, the outlet price in each tag can be read out, the heat/magnetic processing device can set the displayed price, and the displayed prices can be rewritten in any order, i.e., without the need to sort multiple types of merchandise.

Second Embodiment

Figure 2:
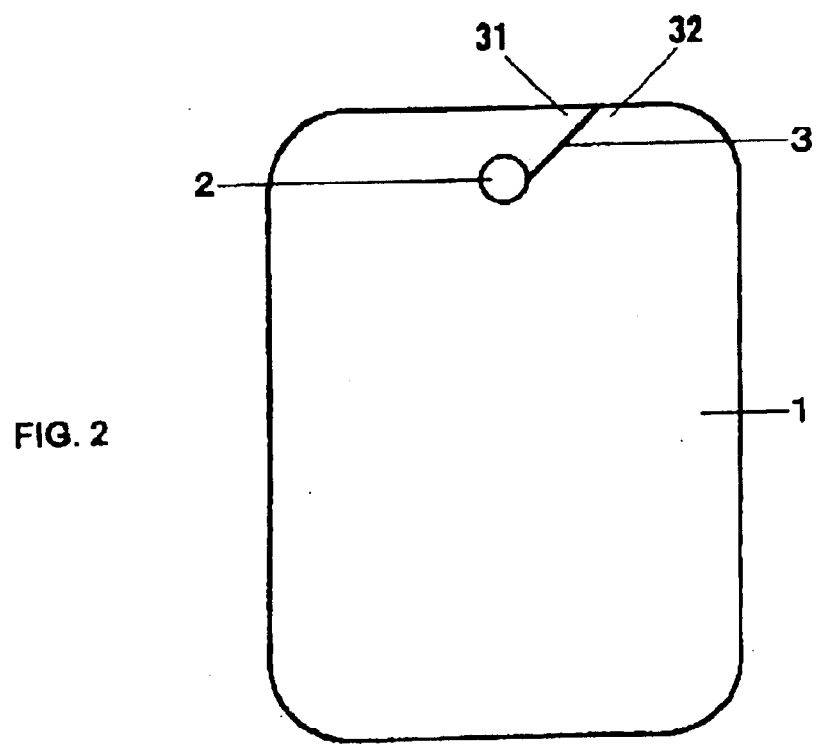
FIG. 2 is a plan view of a merchandise tag according to a second embodiment of the present invention.

As shown in FIG. 2, a merchandise tag according to a second embodiment of the present invention has an attachment hole 2 formed in the approximate periphery of a non-contact wireless tag 1, and a slit 3 is formed therein that runs diagonally from the periphery to the attachment hole 2.

In the merchandise tag according to the first embodiment, the direction of the slit 3 is perpendicular with respect to the periphery. However, in the second embodiment, the slit 3 is formed at an angle of between 20 and 70 degrees with respect to the periphery.

In the first embodiment, when the tag is pulled in the perpendicular direction, the attachment implement will become wedged in the slit 3, and thus the tag can easily be removed. However, in the second embodiment, a cord type of attachment implement will not become wedged into the slit 3 when simply pulled in the perpendicular direction, and thus the tag can be prevented from falling off.

Third Embodiment

Figure 3:
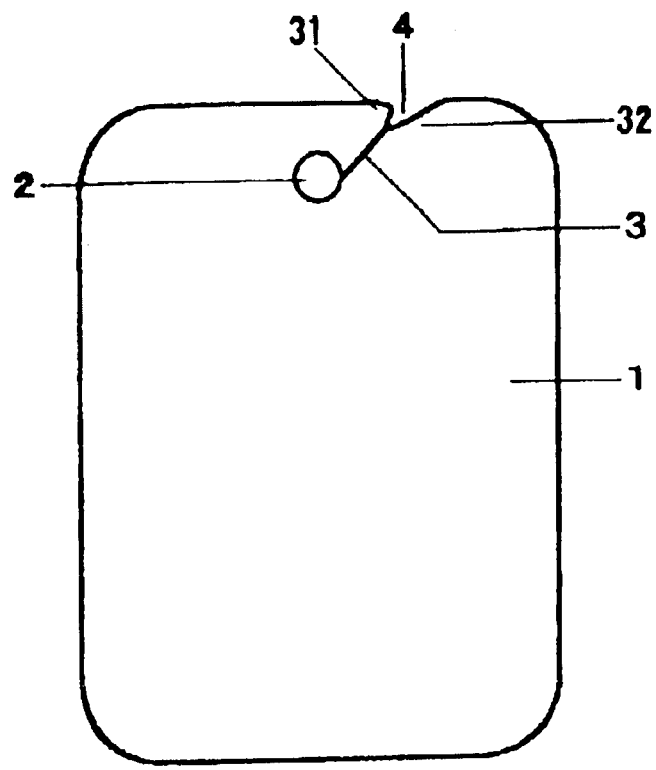
FIG. 3 is a plan view of a merchandise tag according to a third embodiment of the present invention.
Figure 4:
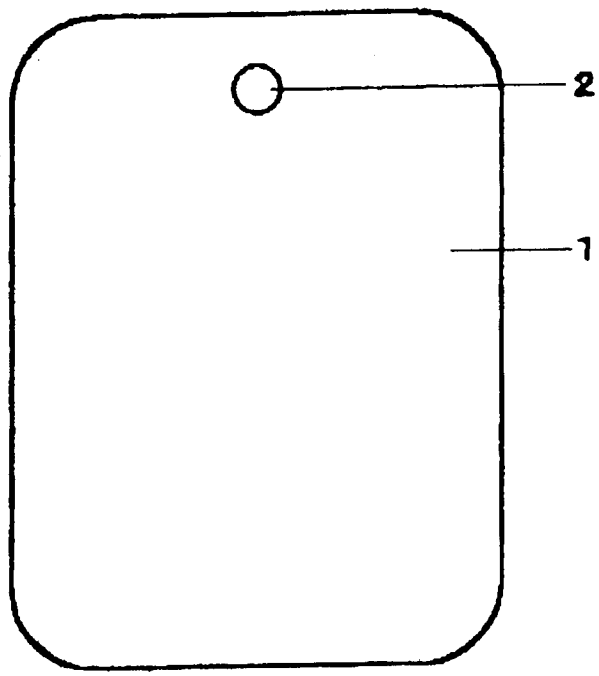
FIG. 4 is a plan view showing an example of a conventional merchandise tag.

As shown in FIG. 3, a merchandise tag according to a third embodiment of the present invention is constructed in the same manner as the second embodiment, except that a rounded mouth portion 4 is included on the slit 3 on the periphery thereof.

In the second embodiment, because the slit 3 intersects with the periphery at an acute angle, there are times when the merchandise to which the tag is attached will be damaged due to this angular portion. With merchandise such as apparel made from silk and the like, and with merchandise made from soft materials and whose surface has been finished, such as leather handbags, shoes, and wallets, there is a danger that the material will be torn or the surface of the material will be damaged. However, in the third embodiment, because there is no acute angular portion, damage to the attached merchandise can be avoided.

Moreover, by connecting the change in the display by changing the color of the layer by a heat processing, magnetic processing, or the like with the read-out of internal data, the display prices can be changed easily and in any order. Thus, it is possible to protect the merchandise to which the tag is attached against damage even if the merchandise is apparel, leather handbags, shoes, wallets, and other merchandise that is made from material that can be easily damaged by the process used to change the price display.

As is clear from the description of the embodiments provided above, according to the merchandise tag of the present invention, a merchandise tag that employs a non-contact wireless tag that is easily attached and removed can be achieved. Even when the non-contact tag is added and attached to an ordinary tag, dual attachment implements are not used, and an excellent and aesthetic attachment is made possible.

In addition, because attachment and removal are easy, reuse is facilitated, and moreover, because the display can be easily changed by changing the color of the layer by a heat treatment, magnetic treatment, or the like with the tag in the removed state, changing the display when reusing the tag is easy.

What is claimed is:

1. A removeable non-contact wireless merchandise tag comprising:

an attachment hole for securing the tag to a separate tag attachment implement, a slit extending from said attachment hole to the circumference of the merchandise tag, and a semiconductor integrated circuit wherein one or more price data entries are stored in the semiconductor integrated circuit, a rounded mouth portion is formed at the intersection between the slit and the circumference.

a permanently attached merchandise tag is also attached to the merchandise by means of said tag attachment implement, and the surface of the removable tag has a color change layer for displaying price information, whereby the color and price information can be changed when the removable tag is not attached to either the merchandise or to the permanently attached tag.

2. The merchandise tag of claim 1, wherein the merchandise tag is adapted for attachment to apparel, shoes, handbags, and wallets.

3. The merchandise tag of claim 1, wherein the angle formed between the slit and the circumference is between 20 and 70 degrees.

4. A removable non-contact wireless merchandise tag adapted for attachment to apparel, shoes, handbags, and wallets by means of the same tag attachment implement that secures a permanently attached merchandise tag to the merchandise, said removeable tag comprising an attachment hole, a slit that is formed to extend from said attachment hole to the circumference of the merchandise tag, a color change layer for displaying price information, and a semiconductor integrated circuit for storing price data, wherein the displayed price corresponds to a price data entry stored in the semiconductor integrated circuit, the angle formed between the slit and the circumference is between 20 and 70 degrees, and a rounded mouth portion is formed at the intersection between the slit and the circumference.

5. A method for changing the displayed price on a removeable non-contact wireless merchandise tag adapted for attachment to apparel, shoes, handbags, and wallets, comprising:

storing at least two prices on a semiconductor memory of a non-contact wireless merchandise tag, reading a first price from the memory and causing the tag to display the first price, attaching the tag to the merchandise with the first price displayed, removing the tag from the merchandise, reading a second price from the memory and causing the tag to display the second stored price, changing a color aver on the tag while the tag is removed from the merchandise, to thereby display the second stored price, and reattaching the tag to the merchandise with the second price displayed.

6. The method of claim 5, wherein the tag comprises an attachment hole and a slit that is formed to extend from said attachment hole to the circumference of the merchandise tag.

\* \* \* \* \*